R. SCHNICKE.
VALVE MECHANISM.
APPLICATION FILED APR. 24, 1911.

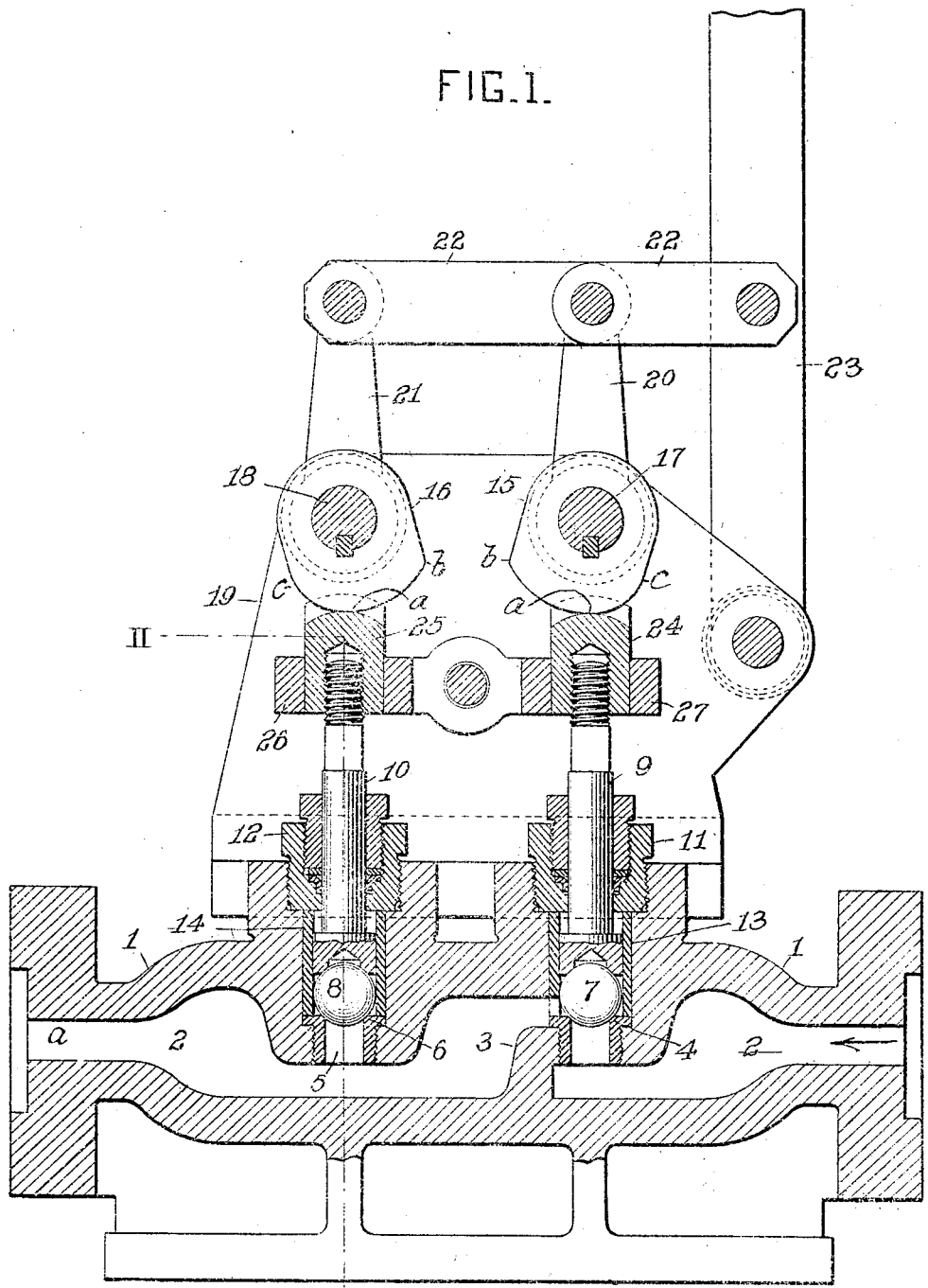

1,042,151.

Patented Oct. 22, 1912.

2 SHEETS—SHEET 2.

WITNESSES:
J. Herbert Bradley
Thomas Joyce

INVENTOR
Robert Schnicke
by Dannie b. Wolcott Atty

UNITED STATES PATENT OFFICE.

ROBERT SCHNICKE, OF WILKINSBURG, PENNSYLVANIA.

VALVE MECHANISM.

1,042,151.   Specification of Letters Patent.   Patented Oct. 22, 1912.

Application filed April 24, 1911. Serial No. 623,095.

*To all whom it may concern:*

Be it known that I, ROBERT SCHNICKE, residing at Wilkinsburg, in the county of Allegheny and State of Pennsylvania, a citizen of the United States, have invented or discovered certain new and useful Improvements in Valve Mechanism, of which improvements the following is a specification.

In operating hydraulic cranes, etc., it is desirable if not practically necessary that the inlet and outlet ports be opened and closed and vice versa by a single continuous movement of the valve operating mechanism. And it is also desirable that the valve mechanism should be of a character that the valve or valves will not be shifted accidentally by the pressure to which they are subjected. Hence it has been the general custom to employ a cylinder and piston valve mechanism the piston or connected parts thereof moving across suitably arranged ports in the cylinder. This construction while in good condition is effective for the intended purpose, but is objectionable on account of the difficulty of maintaining the necessary packing which is usually of the cup type.

The invention described herein has for its object a construction and arrangement of stop valves which can be forced tightly onto their seats and can be simultaneously shifted in opposite directions by a continuous movement of the operating means.

The invention is hereinafter more fully described and claimed.

Figure 2:
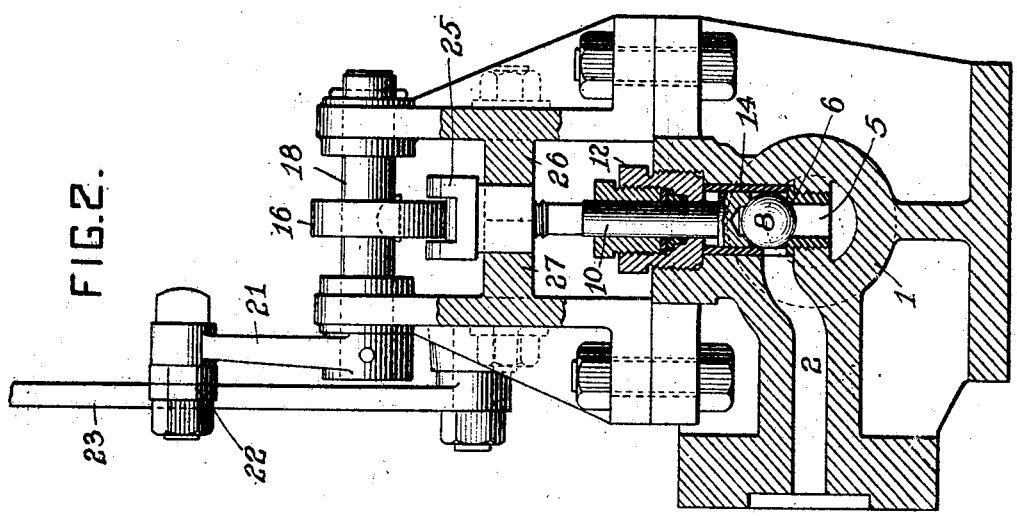

In the accompanying drawings forming a part of this specification Figure 1 is a sectional elevation of my improved valve mechanism the plane of section being in the line of flow of the fluid; Fig. 2 is a sectional elevation on a plane indicated by the line 11—11 Fig. 1; and Fig. 3 is a sectional view illustrating a modified form of the operating means.

In the practice of my invention the casing 1 is formed with a passage 2 through which the fluid flows in the direction indicated by the arrow and across said passage is formed a diaphragm 3 having an opening therethrough for the passage of fluid. This diaphragm is so shaped and the portion around the opening therethrough is so constructed as to form a seat 4 for a valve moving at an angle to the direction of flow of the fluid. The seat 4 is preferably formed by a hard metal bushing as shown. Between the diaphragm and the discharge end $a$ of the valve an exhaust passage 5 is formed a portion of the wall of such passage being constructed to form a valve seat 6. The valves 7 and 8 are preferably adapted to be moved away from their seats by fluid pressure and are shifted toward and onto their seats by stems 9 and 10 which extend through packing boxes 11 and 12 of any suitable type or construction. It is preferred that the valves should be of the ball type and should be free to move so that new portions will bear upon the seats. When using the ball type of valve the stems are provided with heads 13 and 14 having narrow seats bearing on the balls.

In the construction shown in Figs. 1 and 2 the stems 9 and 10 and the valves 7 and 8 are shifted or their movement controlled by cams 15 and 16 which are secured to shafts 17 and 18 rotatably mounted in side plates 19 secured to the casing 1. These shafts or pins are provided with arms 20, 21 connected by links 22 to the operating lever 23. The cams are similar in construction having the portions from $a$ to $b$ formed on arcs of circles concentric with the axis of rotation of the cams, while the portions from $a$ to $c$ are eccentric, and are formed on arcs of shorter radii. While the portions $a$ to $b$ are in contact with the stems of the valves, the latter will be held on their seats from which the valves are forced by fluid pressure while the portions from $a$ to $c$ are in contact with the valve stems. As clearly shown in Fig. 1 these cams are so arranged that when they are rotated in one direction one of the valves as 7 will be positively shifted toward and if the movement is sufficient onto its seat while the other valve is permitted to be forced away from its seat by fluid pressure. A reversal of the direction of rotation of the cams will positively shift the second valve and permit of the unseating of the first valve. The cams are so arranged on their operating shafts that a portion of the surface $a$ to $b$ of one cam will engage and bear upon the stem of its valve for a short time, while a corresponding portion of the other cam will bear upon the stem of its valve. It results from this arrangement that both valves will be positively seated at the same time no matter in which direction the cams are operated. As the throw of the cams for a given angular movement thereof should be sufficient to insure the seating of the valves provision should be made to compensate for wear, etc., and to adjust the valves when necessary. This can be conveniently done by providing the stems with adjustable heads or bearing blocks 24 and 25. It is preferred that these blocks should be cylindrical and should be guided by the bracing webs 26 and 27 formed on the side plates as shown in Figs. 1 and 2. By turning the stems, which screw into the heads the pressure of the valves on their seats for a given movement of the cams can be regulated.

Figure 3:
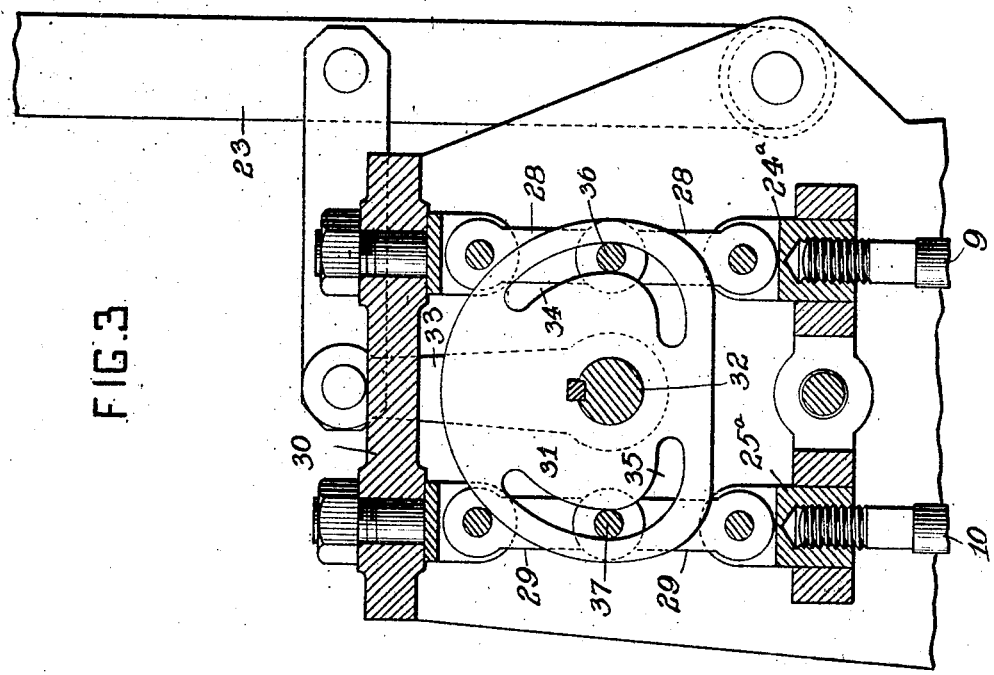

In Fig. 3 is shown a modification of the means for operating and controlling the valves. The adjustable heads 24$^a$ and 25$^a$ are connected by toggle links 28 and 29 to the cap 30 which is secured on the side plates 19. A disk is secured to a shaft or pins 32 rotatably mounted in the side plates and provided with an operating arm 33 which may be connected to a lever 23. The disk is provided with cam shaped slots 34 and 35 into which project respectively the pivotal pins 36 and 37 connecting the links of the toggles. The several parts of this construction are so combined that when the disk is turned in one direction the links of one of the toggles will be brought into line with each other and with their pivotal connections to the adjustable head and the cap 30, while the other toggle is "broken" permitting the valve controlled thereby to be unseated by fluid pressure.

It is characteristic of my improvement that the valves are positively moved to their seats against fluid pressure and that the operating mechanism is so constructed that there is no liability of the valves being unseated by fluid pressure no matter how great. The valves are not only positively shifted to their seats but are positively locked by their operating mechanism in closed positions.

I claim herein as my invention:

1. In a valve mechanism the combination of two stop valves arranged to seat against fluid pressure and means for positively shifting one of the valves to its seat and permitting the reverse movement of the other valve.

2. In a valve mechanism the combination of two stop valves arranged to seat against fluid pressure and means for positively simultaneously controlling both valves but in opposite directions and locking one of said valves in closed position.

3. In a valve mechanism, the combination of two stop valves arranged to seat against fluid pressure, and means adapted while moving in one direction to seat one of said valves and by a further movement to permit the shifting of the other from its seat while positively holding the first valve on its seat.

4. In a valve mechanism the combination of two stop valves arranged to seat against fluid pressure, oppositely arranged cams adapted to shift said valves and means for simultaneously rotating said cams in the same direction.

In testimony whereof, I have hereunto set my hand.

ROBERT SCHNICKE.

Witnesses.
ALICE A. TRILL,
THOMAS JOYCE.